Aug. 23, 1960    E. L. ANSEL    2,949,720
REEL BATS FOR HARVESTERS
Filed July 7, 1958    2 Sheets-Sheet 1

INVENTOR.
Eldan L. Ansel.
BY
Frishburn and Gel
ATTORNEYS.

Aug. 23, 1960  E. L. ANSEL  2,949,720
REEL BATS FOR HARVESTERS
Filed July 7, 1958  2 Sheets-Sheet 2
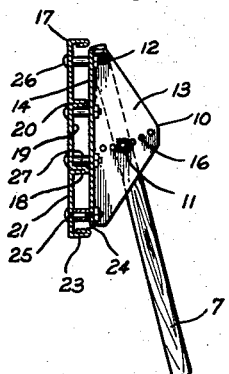
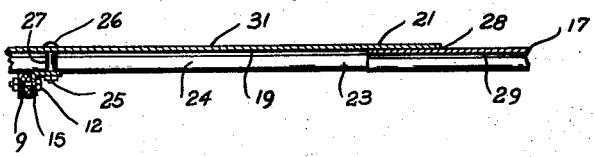
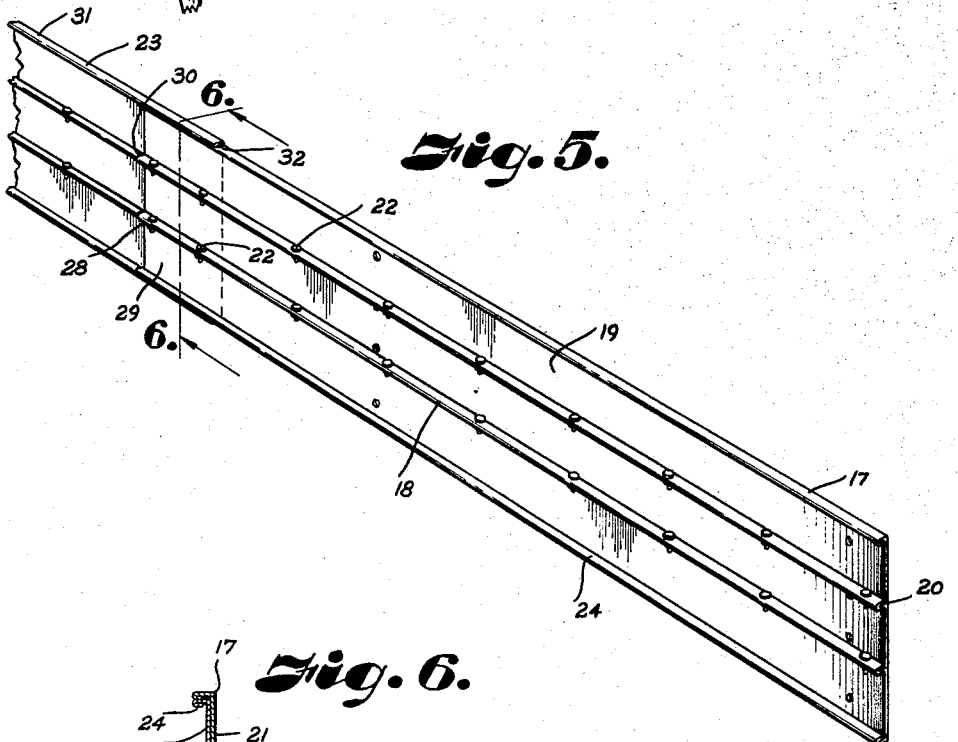
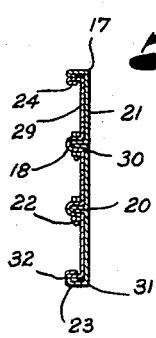
INVENTOR.
Eldan L. Ansel.
BY
Fishburn and Gold
ATTORNEYS.

United States Patent Office 2,949,720
Patented Aug. 23, 1960

2,949,720

REEL BATS FOR HARVESTERS

Eldan L. Ansel, Ulysses, Kans.

Filed July 7, 1958, Ser. No. 746,982

1 Claim. (Cl. 56—220)

This invention relates to a reel for harvesters used in gathering standing grain-bearing plants, and more particularly to bats for said reel.

The conventional reel bats now in use are usually elongate wooden boards which are relatively narrow in width, and normally are mounted on the reel with one bat on each longitudinal row of arms. This arrangement provides narrow surface for engaging the grain-bearing plant, which is inefficient under certain conditions, for example, in the harvesting of plants having thick heavy stalks such as maize. Also, in harvesting wheat wherein the heads are heavily filled, the weight of the head causes the wheat stalk to bend such that the head points downwardly and the plant is shaped like a hook. Such a wheat head frequently becomes engaged over the top of the relatively narrow bat and is carried thereby out of the machine and is wasted. Also, where the plants are tall or entangled, they extend over or catch on the bat and are thrown out of the machine. When it becomes desirable or necessary to provide a wider bat surface, the reels usually are modified to place two or three of the ordinary bats in near edge to edge relation on the radially extending arms of the reel. This adds a large amount of weight to the reel structure as the bats are thick and heavy to have proper strength, and the additional weight has a damaging effect on the various bearings and other structures supporting and driving the reel.

The principal objects of the present invention are to provide a reel bat having a wide, substantially smooth front surface for engaging standing grain-bearing plants and moving the same smoothly into a sickle; to provide a sectional reel bat composed of thin light-weight metal sections having ends in telescoped relation for extension to adapt the length to various length reels; to provide a reel bat section constructed from a single piece of material and having bracing on rib structure rolled integrally with the bat and extending from the inner surface thereof; to provide means for maintaining the internal adjacent faces of the ribbed brace structure in face to face engagement whereby the outer surface of the bat is substantially smooth; to provide a reel bat having rolled side edges for additional rigidity; to provide means for adjustably mounting the bat on the arms of a reel whereby the angular relation of the bat face with the arm may be changed; and to provide a reel bat that is economical to manufacture, light in weight yet strong and durable in use.

In accomplishing these and other objects of the present invention, I have provided improved details of structure, the preferred form of which is illustrated in the accompanying drawings, wherein:

Fig. 3 is an enlarged transverse sectional view through the reel bat, taken on the line 3—3, Fig. 2.

Fig. 4 is an enlarged longitudinal sectional view through the reel bat, taken on the line 4—4, Fig. 2.

Fig. 5 is a fragmentary rear perspective view of the reel bat.

Fig. 6 is a transverse sectional view taken on the line 6—6, Fig. 5.

Figure 1:
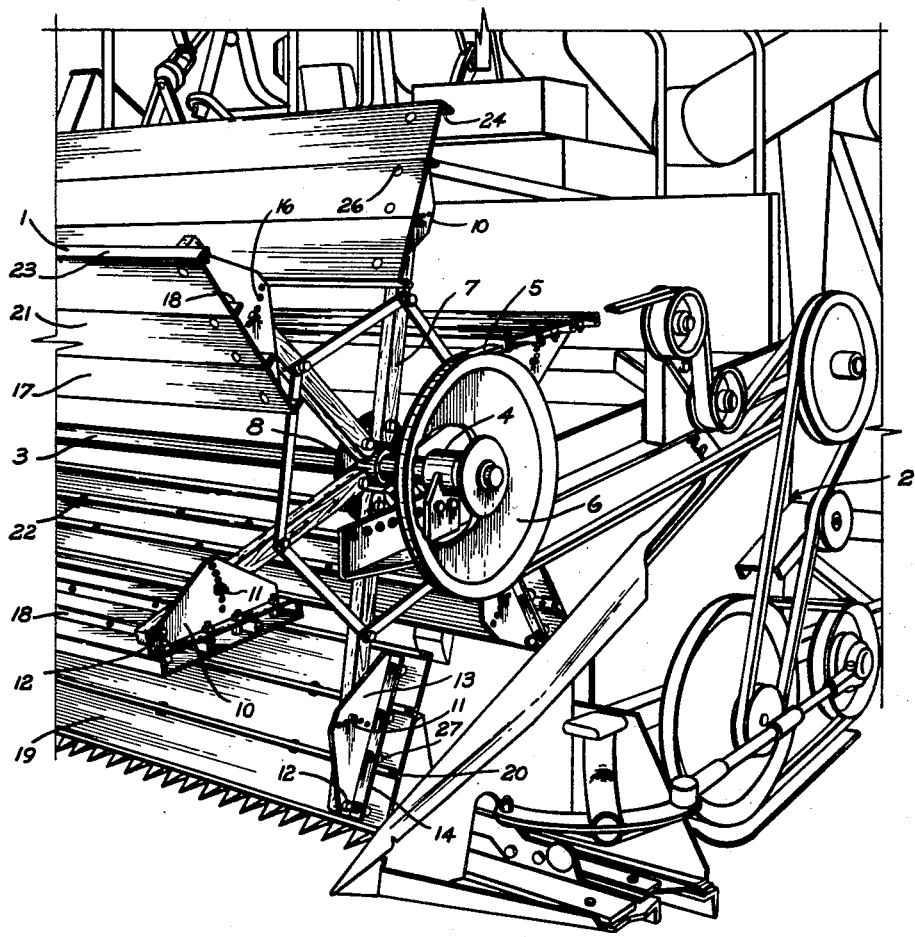
Fig. 1 is a fragmentary perspective view of a reel having my improved bats thereon and mounted upon a harvester type structure reel with portions broken away to show said reel bats.
Figure 2:
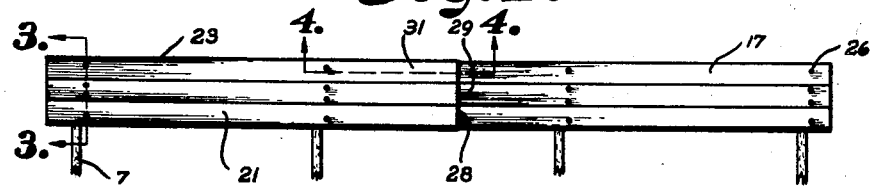
Fig. 2 is a front elevational view of the reel bat on a reduced scale from that of Fig. 1.

Referring more in detail to the drawings:

1 designates a reel rotatably mounted on a harvester type machine 2. The reel has an axle shaft 3 rotatably supported at both ends in the usual manner by bearings 4 on the machine 2. The reel is rotated by an endless belt 5 operatively engaged on a pulley 6 secured on the end of the axle shaft 3, with the endless belt 5 being driven by a suitable source of power (not shown). The axle shaft 3 has rows of radially extending arms 7 aligned and spaced longitudinally thereon, with circular hub members 8 securing the arms 7 to the axle shaft 3 for rotation therewith. The radially extending arms 7 have a plurality of apertures 9 in the outer end portion for mounting a triangularly shaped bracket member 10 thereon by means of bolts or the like 11 and 12.

The bracket members 10 have a plate portion 13 with a laterally turned flange 14 extending at substantially right angles to the plate portion 13, and are swingably mounted on the arms 7 by the bolts 12 extending through an opening 15 in the corner of the bracket member adjacent the outer end of the arm 7 so that the flange 14 is generally coplanar with the arm 7. The plate portion 13 has a row of apertures 16 arranged in an arc with the opening 15 at the axis thereof, said aperture 16 receiving the bolt 11 for securing the bracket member in selected position with the laterally turned flange 14 in a desired angular relation to the arm 7 for a purpose later described. It will be obvious that the angular relation of the flange 14 with the arm 7 may be changed by merely removing the bolt 11, moving the bracket member about the pivotal mounting bolt 12 to the desired position with apertures 16 and 9 in alignment, and securing the bolt 11 in the aligned apertures 16 and 9.

An elongate bat 17 is secured to the laterally turned flange 14 of the bracket member 10, and is a relatively wide structure being approximately three times as wide as the usual wooden bat. The bat 17 is composed of a light-weight ductile sheet metal, such as aluminum or various alloys having proper strength and rigidity such that it may be rolled or formed into the bat without fracturing the material. An elongate sheet of aluminum or the like is processed by the method known as "rolling" to form the bat 17 having ribs 18 extending inwardly and longitudinally the length of the inner face 19 of the reel bat 17, with the ribs 18 normally extending inwardly at substantially right angles to the inner face 19. I have found that two longitudinal ribs 18 spaced apart as shown in Fig. 5, provide ample rigidity for a relatively wide reel bat. The ribs 18 are U-shaped in cross section with internal adjacent faces 20, and are rolled whereby the internal adjacent faces 20 are in close relation, preferably with said faces engaged adjacent the outer face 21 of the reel bat whereby the outer face is substantially smooth and free of depressions or the like which would catch or strike a head of grain to shatter it. Small screws or the like 22 extend transversely through the ribs 18 at longitudinally spaced intervals to insure the close relation of the internal adjacent faces 20. During the rolling process, the side edges of the reel bat 17 are rolled to provide inwardly extending flanges 23 with the extreme edge of the flange turned laterally and forwardly substantially parallel with the flange 23 as at 24 to provide a more rigid structure.

The bat 17 is secured on the laterally turned flange 14 by means of carriage bolts 25 having rounded heads 26 engaging the outer face 21 of the bat, with spacers 27 between the inner face 19 and the flange 14. The spacers 27, are preferably as long as the ribs 18 are deep to prevent the ribs from being distorted by engaging the flange 14.

In machines having relatively long reels of approximately fourteen feet or more, the reel bats may be comprised of two sections having their adjacent ends in mated relation as indicated at 28, Fig. 5. The underlying section 29 of the engaging ends of the reel bats has the portion of the ribs 18 adjacent the underlying end spread open as indicated at 30 to receive the overlying portion of the ribs 18 of the overlying section 31, and the flanges 23 of the underlying section 29 are bent slightly inwardly adjacent the end portion such that they are slidable within the flanges 23 of the overlying section 31, as indicated at 32. Screws 22 extend transversely through the mated ribs 18 to secure the ends together whereby the sections 29 and 31 have somewhat greater rigidity and are less likely to warp than a single long section. Furthermore, the sections may be extended or contracted to permit adaptation of a reel bat for mounting the same on reels having different lengths.

It will be obvious from the foregoing that I have provided a reel bat which is lighter, stronger, more efficient in operation, adjustable in size and economical to manufacture.

It is to be understood that while I have illustrated and described one form of my invention, it is not to be limited to the specific form or arrangement of parts herein described and shown except insofar as such limitations are included in the claim.

What I claim and desire to secure by Letters Patent is:

A lightweight bat for a harvester type reel having arms and comprising, an elongate bat of a single piece of thin sheet metal and being relatively wide, said bat having an inner face and a substantially smooth, uninterrupted planar outer face, ribs extending substantially perpendicularly from said inner face and extending longitudinally substantially the length of said bat in spaced parallel relation, said ribs being formed integrally with said bat, said ribs having a U-shaped cross-section with internal adjacent faces thereof engaging adjacent the outer face of the bat, a plurality of spaced screws extending transversely through said ribs for securing said internal adjacent faces together, flanges formed integrally with said bat and extending inwardly in substantially perpendicular relation to said inner face and extending along opposite longitudinal side edges thereof, said flanges terminating in a U-shaped portion to provide additional rigidity, said bat being mounted upon bracket members adapted to be secured to said arms of a harvester type reel whereby the crops to be harvested are contacted by a substantially smooth, uninterrupted planar face which results in a minimum of crop wastage.

References Cited in the file of this patent

UNITED STATES PATENTS

| | | |
|---|---|---|
| 2,012,198 | Mazzini | Aug. 20, 1935 |
| 2,430,298 | MacGregor | Nov. 4, 1947 |
| 2,685,161 | Scranton et al. | Aug. 3, 1954 |